Patented Sept. 18, 1945

2,384,955

UNITED STATES PATENT OFFICE 2,384,955

ESTERS OF 4-CYCLOHEXENE-1,2-DICARBOXYLIC ACID

Clarence L. Moyle, Midland, Mich., assignor to The Dow Chemical Company, Midland, Mich., a corporation of Michigan No Drawing. Application October 1, 1941, Serial No. 413,123

9 Claims. (Cl. 260—468)

This invention concerns certain new esters and a method of making the same. The esters provided by the invention are haloalkyl and halocycloalkyl esters of 4-cyclohexene-1,2-dicarboxylic acid having the formula:

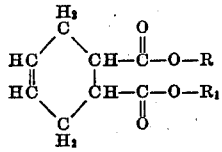

wherein R represents a member of the group consisting of haloalkyl, and halocycloalkyl radicals, which radicals contain a plurality of carbon atoms and in which the carbon atom attached to the carboxyl group contains no halogen substituent and $R_1$ represents a member of the group consisting of hydrogen and of haloalkyl and halocycloalkyl radicals, which radicals contain a plurality of carbon atoms and in which the carbon atom attached to the carboxyl group contains no halogen substituent. They are colorless liquids or solids, soluble in common organic solvents such as ethanol, methanol, carbontetrachloride and acetone, and are useful as agents for incorporation in vinylidene chloride polymers to stabilize the latter against decomposition by light and also as insecticidal ingredients of compositions, such as fly sprays, for the control of household insect pests.

The new esters may be prepared by reacting a halohydrin or a polyhaloalkanol in which the halogen atoms are attached to carbon atoms other than that connected with the hydroxyl group, which polyhaloalkanols are hereinafter included in the term halohydrin, with 4-cyclohexene-1,2-dicarboxylic acid or its anhydride. An esterification catalyst, e. g. benzene sulfonic acid and p-phenol sulfonic acid, may be employed although this may not be necessary when the anhydride is reacted with a halohydrin to form a mono-ester. Mixed esters in which the two R groups in the formula given above represent different haloalkyl or halocycloalkyl groups are preferably prepared by reacting the anhydride with one of the two corresponding halohydrins to form a mono-ester of 4-cyclohexene-1,2-dicarboxylic acid and thereafter reacting the latter with the other halohydrin to form the mixed ester. The mixed esters may also be formed by reacting the 4-cyclohexene-1,2-dicarboxylic acid or its anhydride with a mixture of halohydrins.

The reaction to form the ester may conveniently be carried out by heating a mixture of one or more halohydrins, e. g. ethylene chlorohydrin, ethylene bromohydrin, propylene chlorohydrin, propylene bromohydrin, butylene chlorohydrin, 1,3-dichloro-2-propanol, cyclohexene chlorohydrin, or methyl-cyclohexene chlorohydrin, etc., and 4-cyclohexene-1,2-dicarboxylic acid or its anhydride to boiling under reflux. The reactants may be used in any desired proportions, but the yield of a mono-ester product is highest when 0.7 mol or more, preferably about 1 mol, of 4-cyclohexene-1,2-dicarboxylic acid or its anhydride is employed per mol of halohydrin. When a di-ester is desired, 2 mols or more, preferably between 2 and 10 mols, of halohydrin may advantageously be used per mol of acid or anhydride reactant. The reaction is preferably carried out in the presence of an esterification catalyst, such as those hereinbefore mentioned, but a catalyst is not required. A very small proportion of catalyst, e. g. from 0.001 to 0.1 mol of catalyst per mol of the acid or anhydride reactant, usually suffices to promote smooth and rapid reaction.

When carrying out the reaction to form either a mono- or a di-ester using 4-cyclohexene-1,2-dicarboxylic acid as a reactant, and when carrying it out to form a di-ester using the corresponding acid anhydride as a reactant, water is, of course, formed as a by-product. In such instances, the rate and completeness of the reaction may be furthered by removing the water as it is formed. This may be accomplished, by carrying the reaction out in the presence of a water-entraining agent such as benzene, toluene, ethylene chloride, or propylene chloride, etc., and during the reaction distilling the entraining agent and water from the reaction mixture. In most instances, a portion of the halohydrin reactant may itself serve as such entraining agent for removal of the water. In the reaction of a halohydrin with an equimolecular amount of the acid anhydride to produce a mono-ester, water is not formed. From 1 to 3 hours of heating suffices for carrying out the reaction, but longer heating may in some instances be required.

The ester products may be separated from the reacted mixture by usual purification procedures, the preferred procedure depending, of course, upon whether it is a mono-ester, a di-ester, or a mixture thereof which has been produced. When, as is often the case, the reaction mixture contains both a mono-ester and a di-ester, it may conveniently be scrubbed with an aqueous solution of an alkali, e. g. NaOH, $Na_2CO_3$, $NaHCO_3$, or $KHCO_3$, etc., to extract the acid ingredients including the mono-ester product and leave the di-ester. The latter may be further purified, if necessary, by fractional distillation. The extract may then be acidified to precipitate the mono-ester which may be separated and further purified, e. g. by crystallization from a solvent. Certain of such steps may, of course, be omitted when the ester product to be separated from the crude reaction mixture is either a mono-ester or a di-ester alone.

The following examples describe a number of ways in which the principle of the invention has been applied but are not to be construed as limiting the invention:

Example 1

93 grams (0.6 mol) of 4-cyclohexene-1,2-dicarboxylic acid anhydride, 388 grams (4.83 mols) of anhydrous ethylene chlorohydrin and 1 gram (0.006 mol) of benzene sulfonic acid were heated together in a flask fitted with a condenser. The excess chlorohydrin and the water formed during the reaction were slowly distilled over a period of two hours. The crude di-(2-chloroethyl) ester of 4-cyclohexene-1,2-dicarboxylic acid remaining in the flask was mixed with 150 c. c. of carbon tetrachloride and the mixture washed free of acidic ingredients with dilute aqueous sodium carbonate solution. It was then fractionally distilled, whereby there was recovered 150.1 grams (0.505 mol) of the pure ester, or a yield of 84 per cent of theory based on the 4-cyclohexene-1,2-dicarboxylic acid anhydride used. Di-(2-chloroethyl)-4-cyclohexene-1,2-dicarboxylate is a colorless, mobile liquid boiling at 185–190° C. under 7 mm. pressure. It is only slightly soluble in water. Its specific gravity is 1.25 at 25° C. referred to water at 25° C. and its refractive index, $N_D^{25}$, is 1.4933. It has the formula:

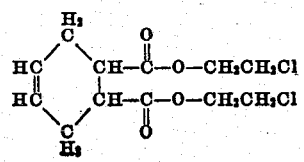

Example 2

30.4 grams (0.2 mol) of 4-cyclohexene-1,2-dicarboxylic acid anhydride and 16.1 grams (0.2 mol) of anhydrous ethylene chlorohydrin were stirred together for four hours at 110–125° C. The crude reaction mixture was extracted with 220 grams of 10 per cent aqueous sodium bicarbonate solution. A small amount of insoluble material was separated from the aqueous extract and the latter was then acidified with hydrochloric acid, whereby there was obtained 32 grams of a pale yellow solid. The latter was purified by redissolving in aqueous sodium bicarbonate solution and carefully precipitating with dilute mineral acid. The resulting product consisted of almost colorless crystals of mono-(2-chloroethyl) ester of 4-cyclohexene-1,2-dicarboxylic acid. It melted at 66–68° C. It has the formula:

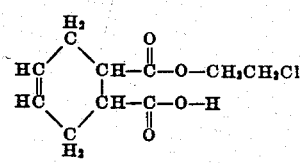

Example 3

In a manner similar to that described in Example 1, 4-cyclohexene-1,2-dicarboxylic acid anhydride was, in separate experiments, reacted with 1-chloropropanol-2, 1,3-dichloropropanol-2, and 3-chloropropanol-1, respectively, to form the corresponding di-haloalkyl esters. The reaction conditions for the formation of these di-esters and their properties are given in the accompanying table.

Among the mono-haloalkyl and mono-halocycloalkyl esters of 4-cyclohexene-1,2-dicarboxylic acid which may be prepared by reacting 4-cyclohexene-1,2-dicarboxylic acid or its anhydride with the appropriate halohydrin or halocyclohexanol are the 1-chloro-2-propyl, 3-chloro-

Table

| Mols anhydride | Halohydrin used | Mols halohydrin | Reaction conditions | | | Dihaloalkyl ester products | | | | |
|---|---|---|---|---|---|---|---|---|---|---|
| | | | Time | Press. | Temp. | M. P. | B. P. | $D_{25}^{25}$ | $N_D^{25}$ | Formula |
| | | | Hours | | °C. | °C. | °C. | | | |
| 0.25 | 1-chloropropanol-2. | 2.0 | 3.0 | 1 atm | 115–125 | Viscous liquid. | 178–188 at 5.5 mm. | 1.18 | 1.4837 | (structure) |
| 0.25 | 1,3-dichloropropanol-2. | 2.0 | 2.0 | 1 atm | 160–172 | ...do..... | 230–240 at 5.0 mm. | 1.32 | 1.5103 | (structure) |
| 0.3 | 3-chloropropanol-1. | 1.8 | 3.0 | 125–140 mm. | 110–135 | 74.5–76 | (¹) | | | (structure) |

¹ Crude product washed with dilute sodium hydroxide and recrystallized from ethanol.

n-propyl, 2-chloro-n-propyl, 2-chlorocyclohexyl, 4-bromocyclohexyl, and 2-bromoethyl esters. Among the mixed di-esters of 4-cyclohexene-1,2-dicarboxylic acid which may be prepared by further reacting mono-esters of said acid with a halohydrin or a halocyclohexanol are the 2-chloroethyl 2-bromoethyl ester prepared by reacting the mono-(2-chloroethyl) ester with 2-bromoethanol-1, the 2 - chlorocyclohexyl 3 - chloro-n-propyl ester prepared by reacting the mono-(2-chlorocyclohexyl) ester with 3-chloropropanol-1, the 2-bromoethyl 3-chloro-n-propyl ester prepared by reacting the mono-(2-bromoethyl) ester with 3-chloropropanol-1, and the 2-bromoethyl 2,2'-dichloroisopropyl ester prepared by reacting the mono-(2,2'-dichloroisopropyl) ester with 2-bromoethanol-1. Other di-haloalkyl and di-halocycloalkyl esters in addition to those listed in the above examples which may be prepared by heating 4-cyclohexene-1,2-dicarboxylic acid or its anhydride with the appropriate halohydrin or halocyclohexanol are the di-(2-bromoethyl), the di-(2-bromoisopropyl), and the di-(2-chlorocyclohexyl) esters.

Other modes of applying the principle of the invention may be employed instead of those explained, change being made as regards the materials employed provided the products described in the following claims be obtained.

I, therefore, particularly point out and distinctly claim as my invention:

1. A compound having the formula:

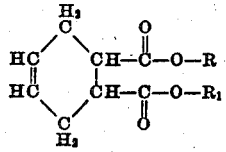

wherein R represents a member of the group consisting of haloalkyl and halocycloalkyl radicals, which radicals contain a plurality of carbon atoms and in which the carbon atom attached to the carboxyl group contains no halogen substituent and $R_1$ represents a member of the group consisting of hydrogen and of haloalkyl and halocycloalkyl radicals, which radicals contain a plurality of carbon atoms and in which the carbon atom attached to the carboxyl group contains no halogen substituent.

2. A compound having the formula:

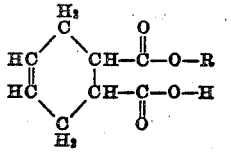

wherein R represents a member of the group consisting of haloalkyl and halocycloalkyl radicals, which radicals contain a plurality of carbon atoms and in which the carbon atom attached to the carboxyl group contains no halogen substituent.

3. A compound having the formula:

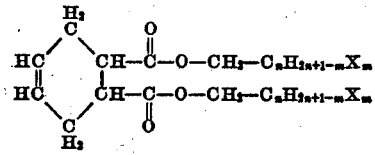

wherein $n$ and $m$ are integers and $m$ is less than $2n+2$ and X represents a member of the class consisting of bromine and chlorine.

4. A compound having the formula:

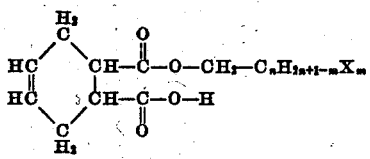

wherein $n$ and $m$ are integers and $m$ is less than $2n+2$ and X represents a member of the class consisting of bromine and chlorine.

5. A compound having the formula:

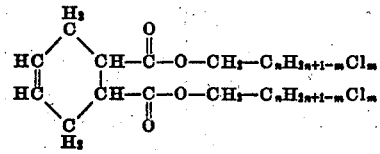

wherein $n$ and $m$ are integers and $m$ is less than $2n+2$.

6. A compound having the formula:

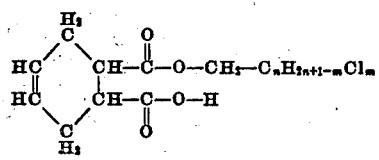

wherein $n$ and $m$ are integers and $m$ is less than $2n+2$.

7. The mono-(2-chloroethyl) ester of 4-cyclohexene-1,2-dicarboxylic acid.

8. The di-(2-chloroethyl) ester of 4-cyclohexene-1,2-dicarboxylic acid.

9. The di-(1-chloro-2-propyl) ester of 4-cyclohexene-1,2-dicarboxylic acid.

CLARENCE L. MOYLE.